(12) United States Patent
Gao et al.

(10) Patent No.: US 8,548,255 B2
(45) Date of Patent: Oct. 1, 2013

(54) METHOD AND APPARATUS FOR VISUAL SEARCH STABILITY

(75) Inventors: Jiang Gao, Sunnyvale, CA (US); Matthias Jacob, London (GB); Philipp Schloter, San Francisco, CA (US); Pasi Ruottinen, Oulu (FI)

(73) Assignee: Nokia Corporation, Espoo (FI)

(*) Notice: Subject to any disclaimer, the term of this patent is extended or adjusted under 35 U.S.C. 154(b) by 515 days.

(21) Appl. No.: 12/761,271

(22) Filed: Apr. 15, 2010
(Under 37 CFR 1.47)

(65) Prior Publication Data

US 2011/0255738 A1    Oct. 20, 2011

(51) Int. Cl.
*G06K 9/62* (2006.01)

(52) U.S. Cl.
USPC ............................... 382/218; 382/225

(58) Field of Classification Search
USPC ................. 382/217, 218, 224, 225
See application file for complete search history.

(56) References Cited

U.S. PATENT DOCUMENTS

| | | |
|---|---|---|
| 2005/0162523 A1 | 7/2005 | Darrell et al. |
| 2005/0180639 A1* | 8/2005 | Trifonov et al. ............ 382/225 |
| 2008/0071988 A1 | 3/2008 | Schloter et al. |
| 2008/0101723 A1* | 5/2008 | Kansal ......................... 382/284 |
| 2008/0114564 A1* | 5/2008 | Ihara ............................ 702/158 |
| 2008/0267521 A1 | 10/2008 | Gao et al. |
| 2009/0316990 A1* | 12/2009 | Nakamura et al. ............ 382/173 |
| 2010/0067745 A1* | 3/2010 | Kovtun et al. ................ 382/106 |

FOREIGN PATENT DOCUMENTS

WO    WO 2010/026170 A1    3/2010

OTHER PUBLICATIONS

Ta, D. et al., *SURFTrac: Efficient Tracking and Continuous Object Recognition Using Local Feature Descriptors*, IEEE (2009) 2937-2944.

International Search Report and Written Opinion for Application No. PCT/IB2011/051653 dated Nov. 3, 2011.

* cited by examiner

*Primary Examiner* — Jon Chang
(74) *Attorney, Agent, or Firm* — Alston & Bird LLP (57) ABSTRACT

Various methods for visual search stability are provided. One example method includes determining a plurality of image matching distances for a captured object depicted in a video frame, where each image matching distance being indicative of a quality of a match between the captured object and a respective object match result. The example method further includes including, in a candidate pool, an indication of the object match results having image matching distances in a candidate region, discarding the object match results having image matching distances in a non-candidate region, and analyzing the object match results with image matching distances in a potential candidate region to include, in the candidate pool, indications of select object match results with image matching distances in the potential candidate region. Similar and related example methods and example apparatuses are also provided.

20 Claims, 9 Drawing Sheets

METHOD AND APPARATUS FOR VISUAL SEARCH STABILITY

TECHNICAL FIELD

Embodiments of the present invention relate generally to object identification, and, more particularly, relate to a method and apparatus for stabilizing the results of a visual search.

BACKGROUND

As digital cameras become increasing available and integrated into mobile computing and communications devices, the opportunities for data entry via captured image data continue to be exploited and evolve. Mobile computing devices can be configured to capture image data, for example, in real-time, and provide functionality to a user with respect to the captured image data. For example, the image data may be analyzed via a visual search to determine the identity of objects that are depicted in the image data. The identity of an object may take the form of textual data that may be used to provide label feedback to a user or perform a search of the Internet based on the textual data. In some instances, however, due to a shaky photographer, disparate lighting conditions, and the like, the results of a visual search can, as a result of multiple iterative analyses, be erratic and sometimes unreliable.

BRIEF SUMMARY

Example methods and example apparatuses are described herein that provide for visual search stability and improved interface feedback to a user. One example method includes determining a plurality of image matching distances for a captured object depicted in a video frame, where each image matching distance being indicative of a quality of a match between the captured object and a respective object match result. The example method further includes including, in a candidate pool, an indication of the object match results having image matching distances in a candidate region, discarding the object match results having image matching distances in a non-candidate region, and analyzing the object match results with image matching distances in a potential candidate region to include, in the candidate pool, indications of select object match results with image matching distances in the potential candidate region.

An additional example embodiment is an apparatus configured for visual search stability. The example apparatus comprises at least one processor and at least one memory including computer program code, the at least one memory and the computer program code configured to, with the at least one processor, cause the apparatus to perform various functionality. The example apparatus may be caused to perform determining a plurality of image matching distances for a captured object depicted in a video frame, where each image matching distance being indicative of a quality of a match between the captured object and a respective object match result. The example apparatus may also be caused to perform including, in a candidate pool, an indication of the object match results having image matching distances in a candidate region, discarding the object match results having image matching distances in a non-candidate region, and analyzing the object match results with image matching distances in a potential candidate region to include, in the candidate pool, indications of select object match results with image matching distances in the potential candidate region.

Another example embodiment is a computer program product comprising a computer-readable storage medium having computer program code stored thereon, wherein execution of the program code causes an apparatus to perform various functionalities. Execution of the computer program code may cause an apparatus to perform determining a plurality of image matching distances for a captured object depicted in a video frame, where each image matching distance being indicative of a quality of a match between the captured object and a respective object match result. The execution of the program code may also cause the apparatus to perform including, in a candidate pool, an indication of the object match results having image matching distances in a candidate region, discarding the object match results having image matching distances in a non-candidate region, and analyzing the object match results with image matching distances in a potential candidate region to include, in the candidate pool, indications of select object match results with image matching distances in the potential candidate region.

Another example apparatus includes means for determining a plurality of image matching distances for a captured object depicted in a video frame, where each image matching distance being indicative of a quality of a match between the captured object and a respective object match result. The example apparatus may also include means for including, in a candidate pool, an indication of the object match results having image matching distances in a candidate region, means for discarding the object match results having image matching distances in a non-candidate region, and means for analyzing the object match results with image matching distances in a potential candidate region to include, in the candidate pool, indications of select object match results with image matching distances in the potential candidate region.

BRIEF DESCRIPTION OF THE DRAWING(S)

Having thus described example embodiments of the invention in general terms, reference will now be made to the accompanying drawings, which are not necessarily drawn to scale, and wherein:

DETAILED DESCRIPTION

Example embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout. The terms "data," "content," "information," and similar terms may be used interchangeably, according to some example embodiments of the present invention, to refer to data capable of being transmitted, received, operated on, and/or stored.

As used herein, the term 'circuitry' refers to all of the following: (a) hardware-only circuit implementations (such as implementations in only analog and/or digital circuitry); (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions); and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in a server, a cellular network device, or other network device.

Figure 1A:
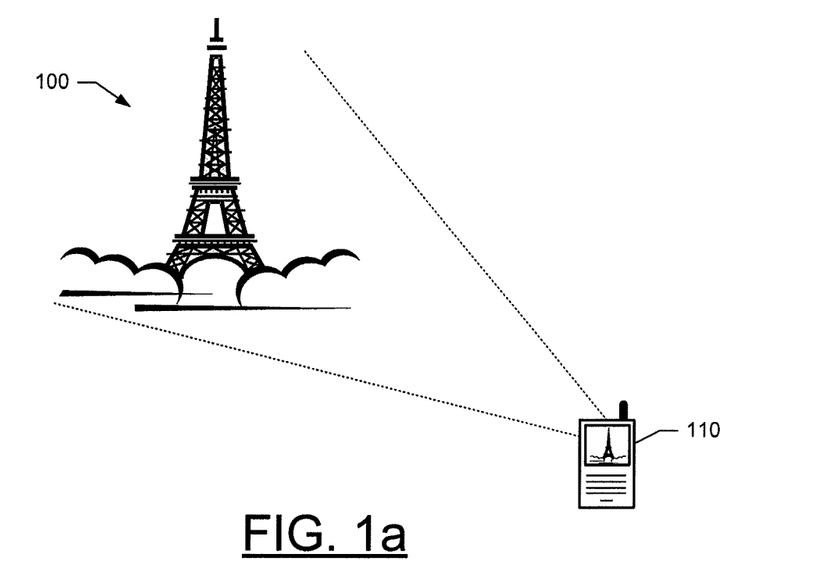
FIG. 1a illustrates an image capturing event according to an example embodiment of the present invention.

FIG. 1a illustrates an image capturing event performed by a mobile terminal 110. The mobile terminal 110 may be configured to include an image capturing module, such as a built-in digital camera. According to various example embodiments, the image capturing module may be configured to cause a current scene being captured to be displayed on a display of the mobile terminal. In this regard, the mobile terminal 110 with the image capturing module may be configured to capture frames of video depicting the scene that the image capturing module is currently directed towards. As the mobile terminal 110 is moved or panned across a scene, objects may enter the captured frames in real-time or near real-time. According to various example embodiments, captured images of the objects may be stored and analyzed by the mobile terminal 110 to identify the objects as the video frames are being captured, which may be referred to as a mobile visual search. In FIG. 1a, the image capturing module of the mobile terminal 110 is being directed at an object that is a landmark, the Eiffel Tower.

Figure 1B:
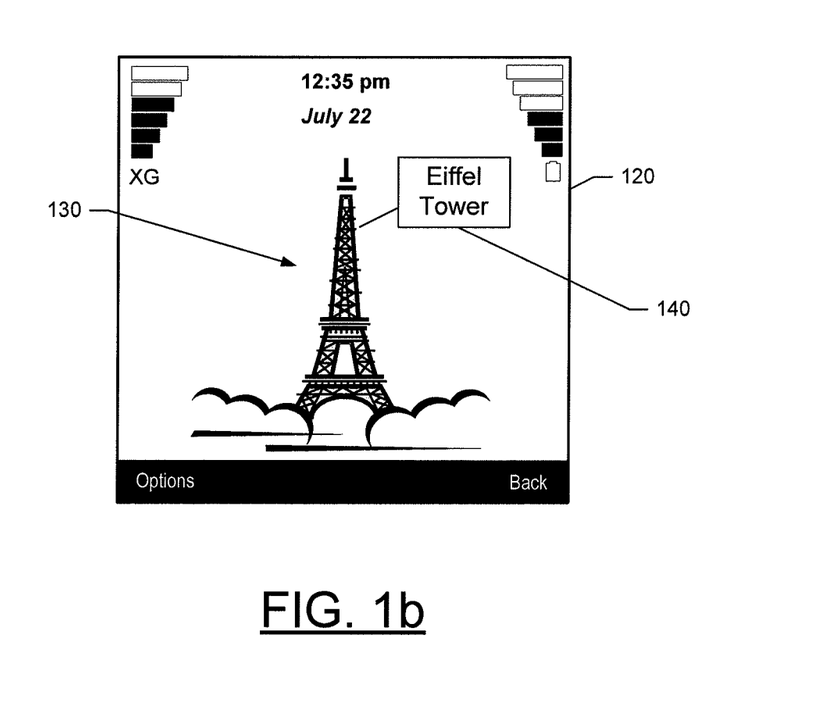
FIG. 1b illustrates the displaying of a representation of an object match result according to an example embodiment of the present invention.

FIG. 1b illustrates an example of an output that may be provided on the display 120 of the mobile terminal 110 during an image capturing event. The mobile terminal 110 has captured a video frame 130 that includes the Eiffel Tower. Via an object identification process, the video frame can be analyzed by, for example, a processor of the mobile terminal 110 against a visual search database stored in the memory of the mobile terminal, or stored elsewhere, to identify an object identification match or object result match between the captured depiction of the object and a description of the object in a database or other data structure. According to some example embodiments, to perform object identification, a video frame including a depiction of an object may be decomposed into image features and comparisons to the visual search database may be performed at, for example, a feature level. If a match between the captured depiction of the object and data within the visual search database is found, then the identity of the object can be determined. As a result, information about the identified object can be provided to the user. For example, as depicted in FIG. 1b, a label 140 providing the name of the object can be output to a display of a user interface. In some example embodiments, a search of the Internet may be performed using the identity of the object. In some example embodiments, links to related information about the object may be provided to the user via the identity information.

Since view point angle, lighting, movement or shaking of the capturing device, noise in the captured image, and the like may have impacts on the object identification process, in some instances a stable match may not be consistently attainable. As a result, identifications of objects may flicker or rapidly change between more than one object match result, rapidly disappear and re-appear when a object match result is found but then subsequently no match result can be determined, or false positive object match results may be provided. In some instances, more than one object match result may be equally likely to be a proper match based on the analysis. In instances where an indication, such as label, rapidly disappears due to an inconsistent match, a user may not be able to interact with the result before the result disappears. Further, false positives can occur, and in some instances, indications of false positive results may continue to be displayed even when a user is no longer pointing the image capturing module at a known object. To remedy these and other issues, some example embodiments of the present invention operate to achieve visual search stability.

According to various example embodiments, a visual search process may include determining a plurality of image matching distances or scores. In this regard, an object depicted in a captured video frame may match a number of objects described in the visual search database to varying degrees. In this regard, each potential object match result may be associated with an image matching distance. The image matching distances may be indicative of a quality of a match between the object depicted in the captured video frame and the respective object match result taken from, for example, a visual search database.

Image matching distances may be determined in a number of ways. For example, according to some example embodiments, image matching distances may be dependent on a number of image feature matches that are found between the object depicted in the captured video frame and the respective object match result in the database, based on a feature-to-feature comparison. Some example embodiments may implement techniques and algorithms such as, for example, content-based image retrieval (CBIR) techniques, also known as query by image content (QBIC) techniques and content-based visual information retrieval (CBVIR) techniques. In some example embodiments, a low image matching distance may indicate that the associated object match result is a more likely to be a proper match than an object match result with a high image matching distance. The example embodiments described with respect to FIGS. 3 through 5 consider image matching distances within a context where lower image matching distances are more likely to be a proper match than higher image matching distances. However, one of skill in the art would appreciate that example embodiments of the present invention could be implemented in a context where higher values are more likely to be a proper match than lower values.

Figure 2:
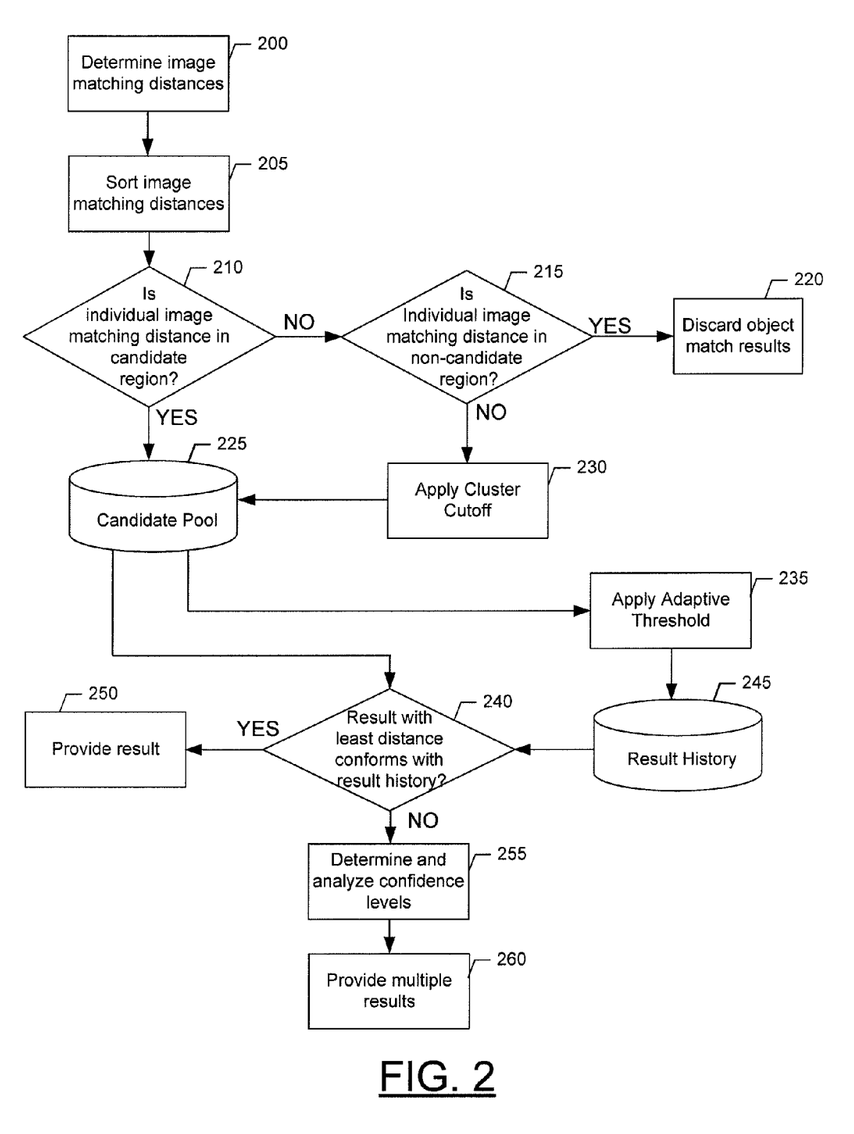
FIG. 2 is a flowchart for determining object match results to provide according to an example embodiment of the present invention.

The flowchart of FIG. 2 illustrates one example method for determining stable and accurate results by analyzing image matching distances. At 200, for a given captured video frame depicting an object, a plurality of image matching distances and associated object match results may be determined. At 205, the plurality of image matching distances may be sorted or otherwise organized, for example, in ascending or descending order. In this regard, FIG. 3 illustrates a graph of a plurality of image matching distances assembled in ascending order.

Figure 3:
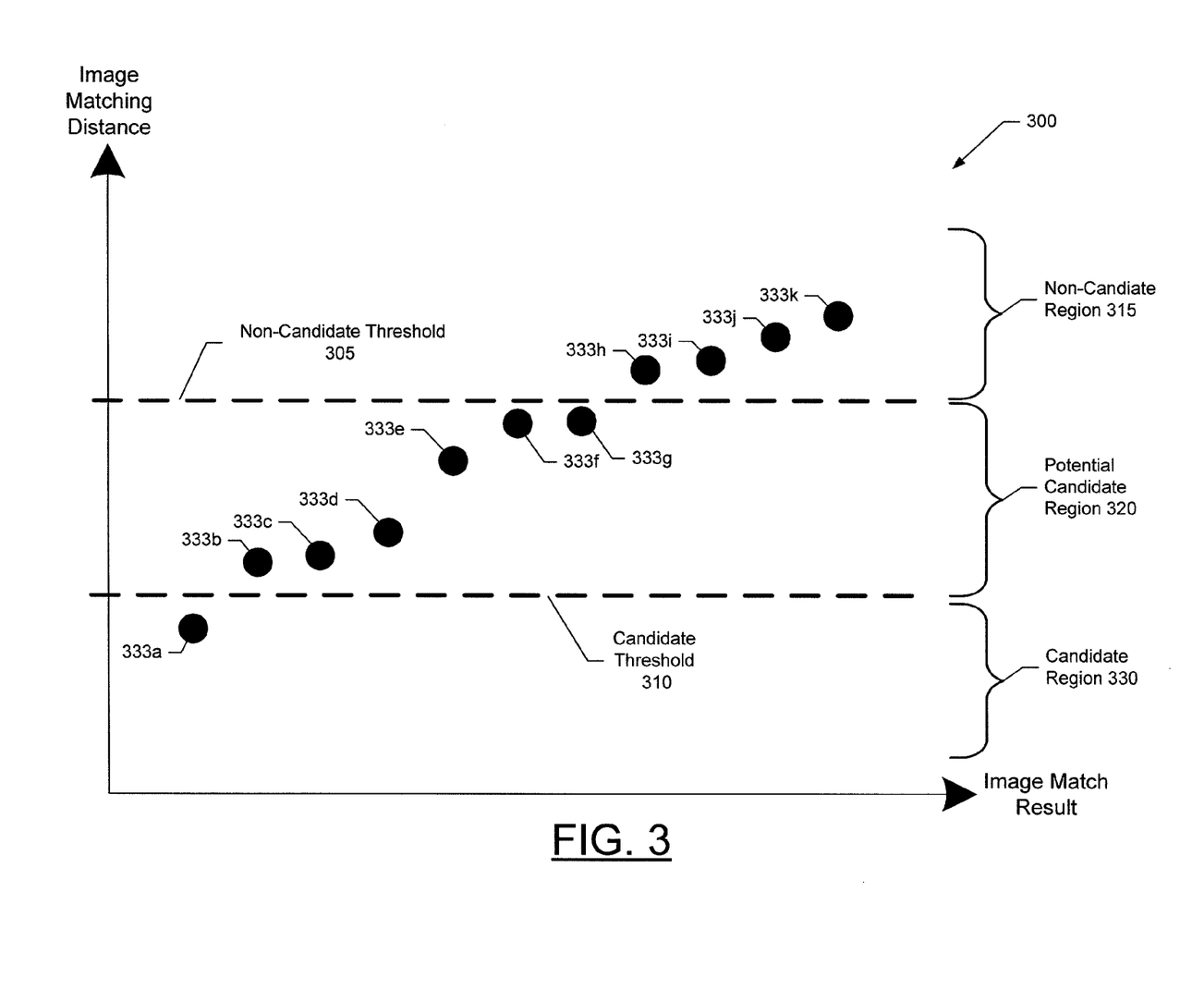
FIG. 3 illustrates a sorted graph of image matching distances according to an example embodiment of the present invention.

FIG. 3 illustrates a first portion of an analysis of the image matching distances according to various example embodiments. The graph 300 of FIG. 3 includes image matching distances 333$a$ through 333$k$ that are to be analyzed. The graph 300 may be divided into three regions based on two defined thresholds, the non-candidate threshold 305 and the candidate threshold 310. Image matching distances that are above the non-candidate threshold 305 (poor matches) are located in the non-candidate region 315 are not considered for further analysis and may be discarded with their respective object match results. In this regard, the image matching distances 333$h$ through 333$k$ may therefore be discarded and not further considered. Image matching distances having matching values that are below the candidate threshold 310 (high quality matches) are located in the candidate region 330 and indications of their respective object match results may be added to a candidate pool, for example, without further consideration. In this regard, the image matching distance 333$a$ is therefore added to the candidate pool.

The image matching distances between the non-candidate threshold 305 and the candidate threshold 310 may reside in the potential candidate region 320, and as such, further analysis of these distances can be conducted to determine whether the indications of the associated object match results should be discarded or added to the candidate pool. In this regard, the image matching distances 333$b$ through 333$g$ may therefore undergo further consideration and analysis to determine which these values should be discarded and which should have an indication of their object match results added to the candidate pool.

The levels of the non-candidate threshold 305 and the candidate threshold 310 may be determined and set in a number of ways. According to some example embodiments, a statistical analysis of image matching distances may be performed, possibly in advance, to determine a range of distances that most frequently results in false positives. This range of distances may be used to define the potential candidate region 320 and similarly the candidate threshold 305 and the non-candidate threshold 310.

Referring again to FIG. 2, analysis with respect to the candidate and non-candidate thresholds are described at 210 and 215. At 210, a determination may be made as to whether any of the image matching distances that are located within the candidate region (below the candidate threshold), and if so, indications of the object match results associated with the image matching distances may be added to a candidate pool at 225. If an image matching distance is not located within the candidate region, then a determination may be made at 215 as to whether the image matching distance is located in the non-candidate region. If the image matching distance is located in the non-candidate region, then the associated image matching distances are discarded at 220. However, if an image matching distance is not located in the candidate region or the non-candidate region, then the image matching distance may be in the potential candidate region.

Figure 4:
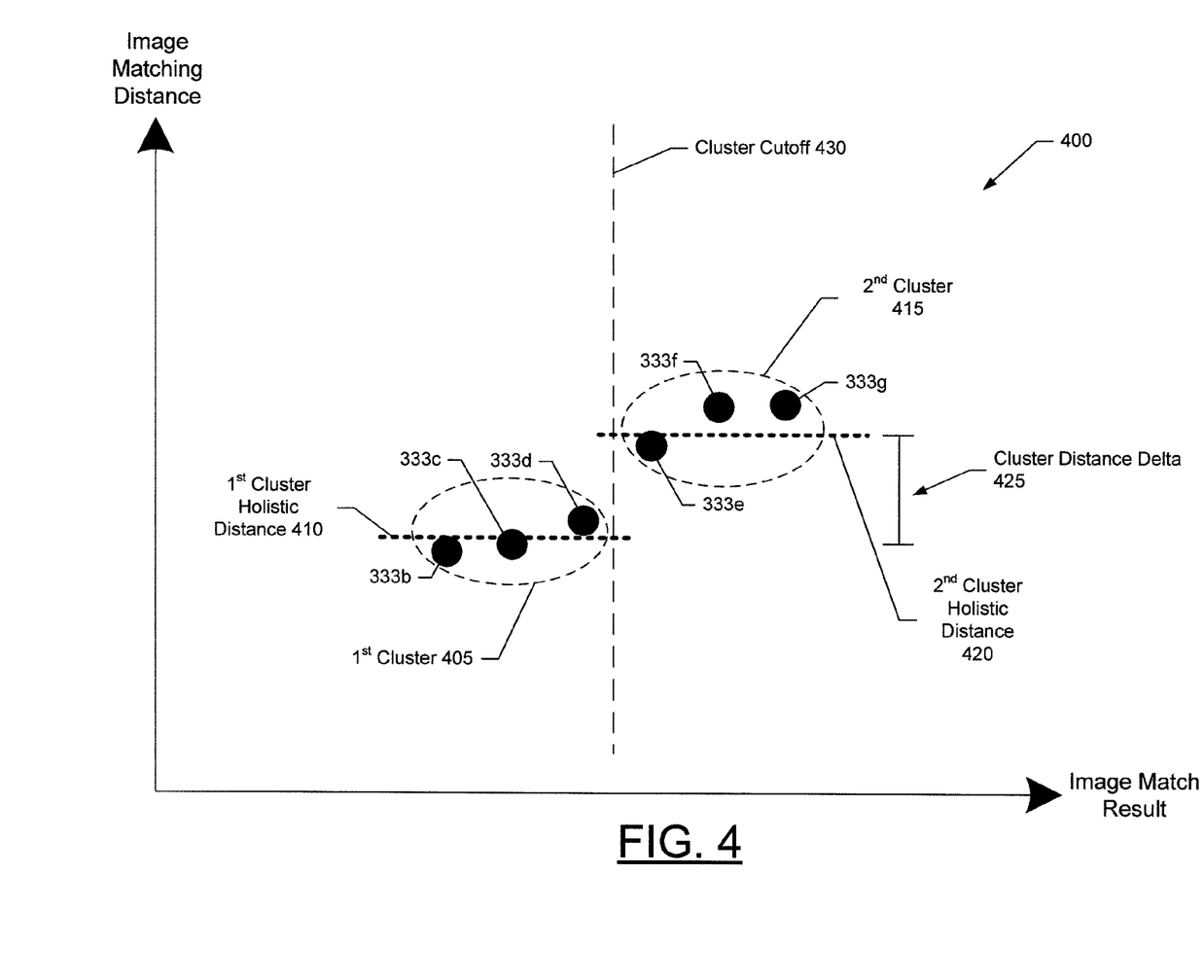
FIG. 4 illustrates the clustering of potential candidate image matching distances according to some example embodiments.

The image matching distances that are located in the potential candidate region may be analyzed through the application of a cluster cutoff technique at 230 and depicted in FIG. 4. With reference to FIG. 4, the image matching distances 333$b$ through 333$g$ are considered. According to various example embodiments, a clustering algorithm may be implemented that iteratively considers each image matching distance in various groupings or clusters and calculates a holistic distance for each cluster. A clustering of the image matching distances may be determined such that, for example, a largest gap or cluster distance delta is present between the holistic distances of the each of the clusters. The holistic distance, according to some example embodiments, may be an average of the image matching distances within a given cluster.

FIG. 4 depicts the formation of two clusters of image matching distances. The first cluster 405 comprises matching values 333$b$ through 333$d$, which define a holistic distance 410 for the first cluster. The second cluster 415 comprises image matching distances 333$e$ through 333$g$, which define a holistic distance 420 for the second cluster. The holistic distance 410 for the first cluster and the holistic distance 420 for the second cluster are separated by a cluster distance delta 425. The separation between the first cluster and the second cluster may define a cluster cutoff 430, where the image matching distances that define a cluster holistic distance that is lower than the cluster holistic distance of the other cluster have indications of their respective object match results included in the candidate pool, and the image matching distances that are included in the cluster with the higher holistic distance are discarded or disregarded. In other words, after having defined the clusters, the example method of FIG. 2 may continue by adding indications of object match results to the candidate pool at 225 that are associated with image matching distances that are included in the cluster with the relatively lower holistic distance, and by discarding the image matching distances that are included in the cluster with the relatively higher holistic distance.

Figure 5A:
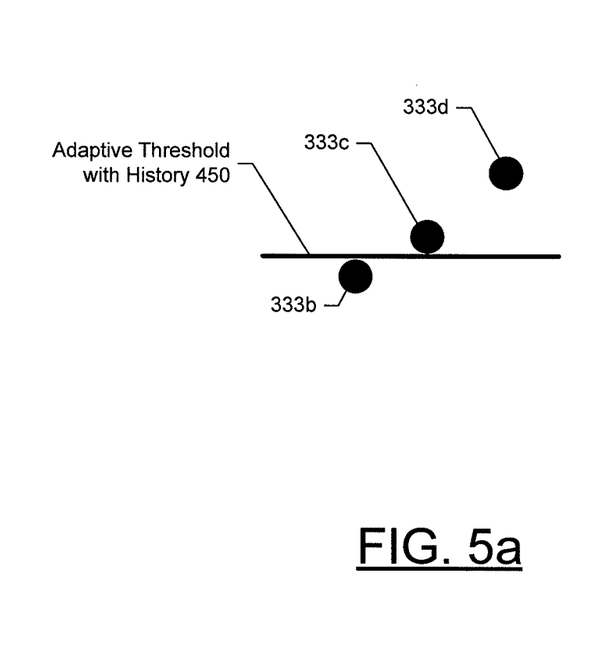
FIGS. 5a and 5b illustrate the application of adaptive thresholds according to some example embodiments.
Figure 5B:
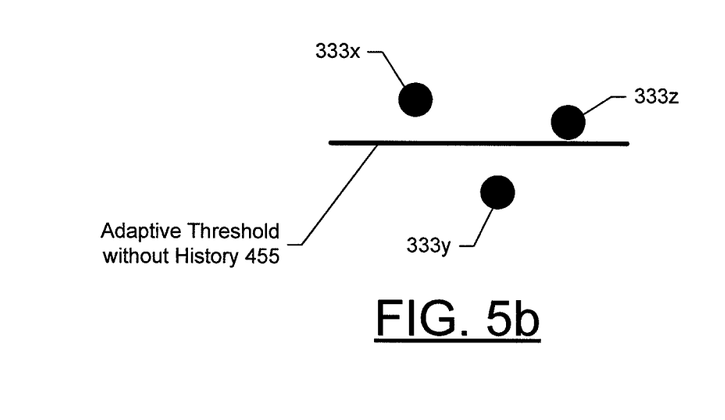

Referring again to FIG. 2, a result history for a captured object may be maintained and updated based on the contents of the candidate pool through the use of adaptive thresholds at 235 to determine whether an indication of an object match result should be added to the result history 245 or whether a frequency of occurrence of an object match result may be incremented. FIGS. 5$a$ and 5$b$ illustrate the application of adaptive thresholds based on whether a result history has been defined or whether a previously stored indication of an object match result is included in the result history. With respect to FIG. 5$a$, if a result history was previously defined than a less restrictive adaptive threshold 450 may be utilized to identify image matching distances that are below the threshold which can have indications of their object match results added to the result history. In some example embodiments, if a particular object match result is already present in the result history, then a result history frequency may be incremented for the object match result. FIG. 5$a$ indicates that the image matching distance 333$b$ would have an indication of its associated object match result added to the result history, or a result history frequency for the object match result associated with image matching distance 333$b$ may be incremented. FIG. 5$b$ illustrates a scenario where image matching distances are applied to an adaptive threshold 455 where no previous result history has been defined. Because no previous history results can be relied upon for subsequent analyses of the candidate pool, the adaptive threshold 455 may be more restrictive than, for example the adaptive threshold 450. With respect to the image matching distances of FIG. 5b, the image matching distance 333y may be added to the result history, while indications of the object match result associated with the image matching distances 333x and 333z may not be added to the result history.

Having updated and maintained the result history, the candidate pool 225 may be considered in view of the contents of the result history 245 at 240. For example, in some example embodiments, confidence levels for the object match results in the candidate pool 225 may be determined based on whether the indications of the object match results have previously been added to the result history 245. In some example embodiments, the result history may include a frequency associated with the number of times that the object match results appear in the result history 245. If an object match result is present in the result history, then an associated confidence level may be incremented. For example, if the object match result with the smallest image matching distance is also included in the result history, then the object match result may be considered stable, and the result may be provided or output to a user interface at 250. In this regard, a representation of the object match result may be caused to be output to a user interface.

If the object match result with the smallest image matching distance (best quality match) is not included in the result history, or if two object match results from the candidate pool have the same image matching distances, then confidence levels for the object match results may be determined and analyzed based on the result history at 255. In this regard, confidence levels for the object match results may be determined, for example, based on the result history frequency for the object match result. In some example embodiments, based on the confidence levels, an object match result that has a confidence level that exceeds a threshold difference from the confidence levels of other object match results may be selected to be the object match result to be output to the user interface. Additionally, if two or more object match results, for example, do not differentiate themselves based on a threshold difference for the confidence levels, then multiple object match results may be provided at 260. For example, if a pattern occurs where two or more object match results, that are present in the history list, cycle one or more times as the top matching result, then the object match results may have the same or similar image matching distances. In this regard, the representations of multiple object match results may be caused to be output to a display of a user interface, possibly in a split screen mode. A display format may be determined based on the confidence levels of the results. Further, according to some example embodiments, each object match result may be output with an associated hierarchy of information links that, for example, a user may explore to determine which of the multiple object match results is most likely to be the proper match. In some example embodiments, the user interface may be configured to receive a selection of an object match result as the correct object match result.

In addition to analyzing the image match distances to determine a high quality and stable object match result, a latching mechanism for the provided results may also be implemented. The latching mechanism may allow a user to interact with an object match result for given period of time to facilitate a user making a selection, despite possible changes in the results due to, for example, slight movements in the image capturing module. In this regard, according to some example embodiments, feedback from an accelerometer may be utilized to determine whether a user has simply tilted or moved an image capturing device to make a selection (e.g., touch the touch screen or push a button), and if such movement is detected, the previously determined object match result may remain on the screen. Alternatively, if the feedback from the accelerometer indicates the image capturing device has been moved to point to a different object, possibly in consideration with other factors such the image being captured, then the newly determined object match result may be displayed and the previously determined object match result may be removed from the display.

According to various example embodiments, a previously determined object match result that is deemed to be stable based on the presence of the result in a result history, or frequency of being included in the result history, may indicate that the previously determined object match result should remain on the screen, despite changes in the currently determined object match result. In this regard, the confidence levels of the results may be considered in view of the result history to determine that the object match result with the highest confidence levels should remain displayed on the screen. The result history, as described above, buffers a number of results and can be utilized to determine whether a new result has been previously determined, to ensure confidence. Utilization of the result buffer, according to some example embodiments, can reduce or eliminate the false positives that can result from motion or image noise.

If a currently determined object match result is found to have a confidence level higher than the previous object match result, then the previously determined object match result should be removed from the display, and the currently determined object match result can be displayed. In this regard, according to some example embodiments, when a user moves an image capturing module to point at a different object, a currently determined object match result may be updated, so as to avoid the previously determined object match result from continuing to be displayed when the result is no longer accurate. If both the previously determined object match result and the currently determined object match result have insufficient confidence levels, relative to a threshold, according to some example embodiments, neither of the results may be displayed. Further, in some example embodiments, a timer may be implemented and, if during the duration of the timer no currently determined object matching result is deemed to be valid or have a sufficient confidence level, then the previously determined object matching result may be displayed until the timer elapses. In some example embodiments, the duration of timer may be user defined.

Implementation of the timer feature in this manner, according to some example embodiments, facilitates the ability of a user to interact with a given result without the result quickly disappearing due to a new determination. Accordingly, false positive results with no level of confidence need not be displayed, while the most recently determined result with sufficient confidence continues to be displayed. This feature, according to various example embodiments, can improve the user experience.

Figure 6:
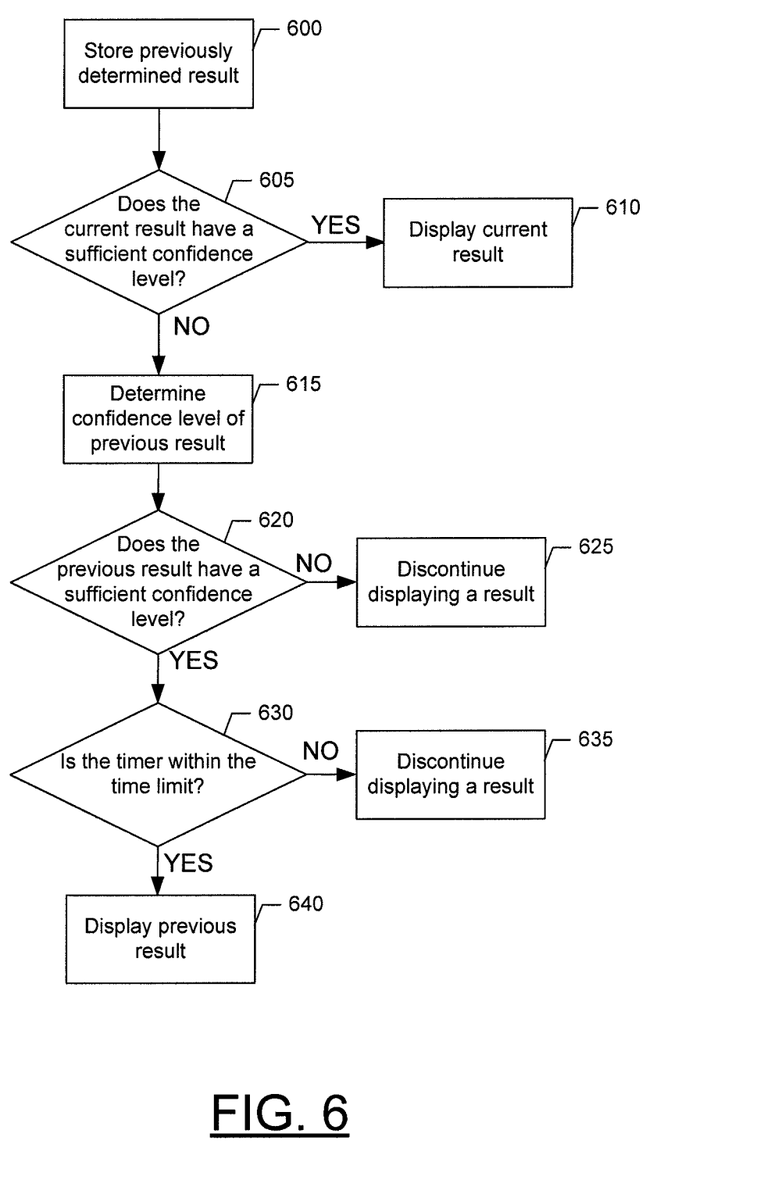
FIG. 6 is a flowchart for latching a display of a representation of an object match result according to some example embodiments.

FIG. 6 illustrates an example method for implementing a latching mechanism for latching or continuing to output a representation of an object match result though monitoring of the confidence levels of a previously and currently determined result, and by monitoring whether a timer has elapsed. The example method of FIG. 6 and associated embodiments may be implemented in conjunction with, for example, the example method of FIG. 2. In some example embodiments, the example method of FIG. 6 and the latching mechanism described herein may be implemented separately and independently from the example method of FIG. 2. As such, the latching mechanism as described herein may be used with any type of visual search technique utilizes a result history and repeatedly determines a next object matching result such that at least a previously determined object match result is generated and a subsequent currently determined object match result is generated.

At 600, the example method of FIG. 6 includes storing a previously determined object match result, such as the one provided at 250 of FIG. 2. At 605, a determination may be made as to whether a newly determined or current object match result (current result) exceeds a threshold confidence level. In some example embodiments, the current object match result may exceed a threshold confidence level if the image matching distance is below a certain threshold, or if an indication (e.g., an image matching distance) associated with the current result is present in a result history, or if a frequency of appearing in the result history associated with the current result exceeds a threshold. If the current result has a sufficient confidence level (e.g., the image matching distance is below a certain threshold, an indication is present in the result history or a result history frequency is above a threshold), then the current result may be displayed at 610. If the current result has an insufficient confidence level relative to the threshold (e.g., the image matching distance is above a certain threshold, an indication is not present in the result history or a result history frequency is below a threshold), then a confidence level of the previously determined object match result (previous result) may be determined, or considered if the confidence level was previously determined, at 615, based on, for example, the result history, and possibly a history result frequency for the previous result. At 620, it may be determined whether the previous result has a sufficient confidence level relative to the same or a different threshold. If the confidence level of the previous result is insufficient (e.g., an indication is not present in the result history or a result history frequency is below a threshold), then displaying of the previously determined result may be discontinued at 625, and the current result need not be displayed either. If the previous result has a sufficient confidence level (e.g., an indication is present in the result history or a result history frequency is below a threshold), then a check of a latch timer may be performed to ensure that the timer has not expired at 630. If the timer has expired, the displaying or outputting of a result may be discontinued at 635. However, if the timer has not yet expired, then the previous result may continue to be displayed at 640.

Figure 7:
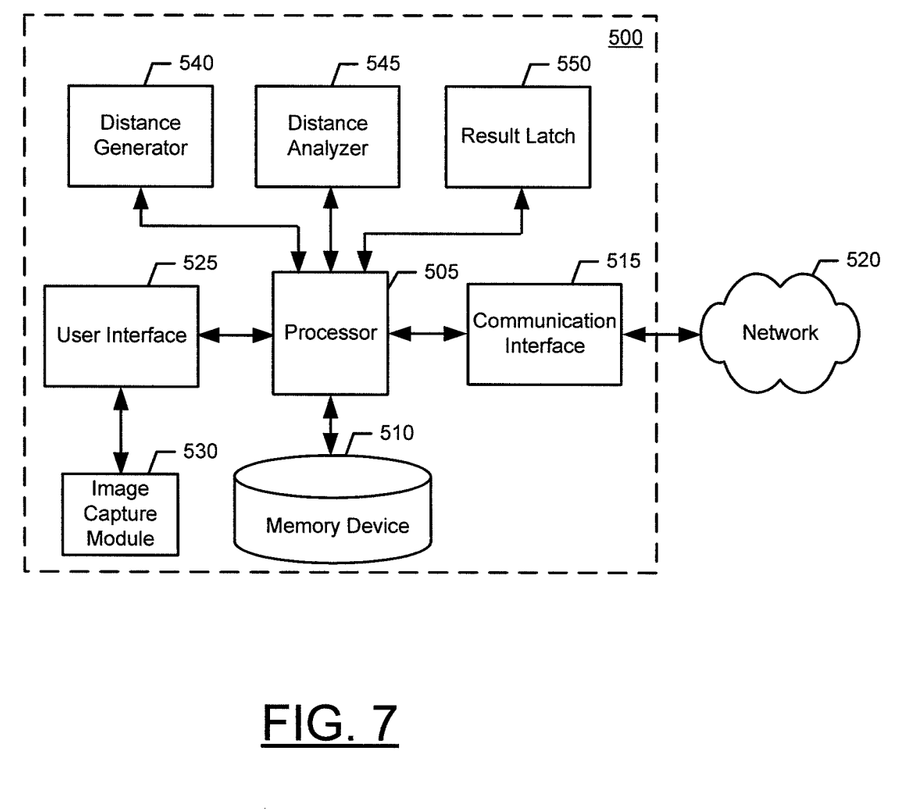
FIG. 7 illustrates a block diagram of an apparatus and associated system for visual search stability according to an example embodiment of the present invention.
Figure 8:
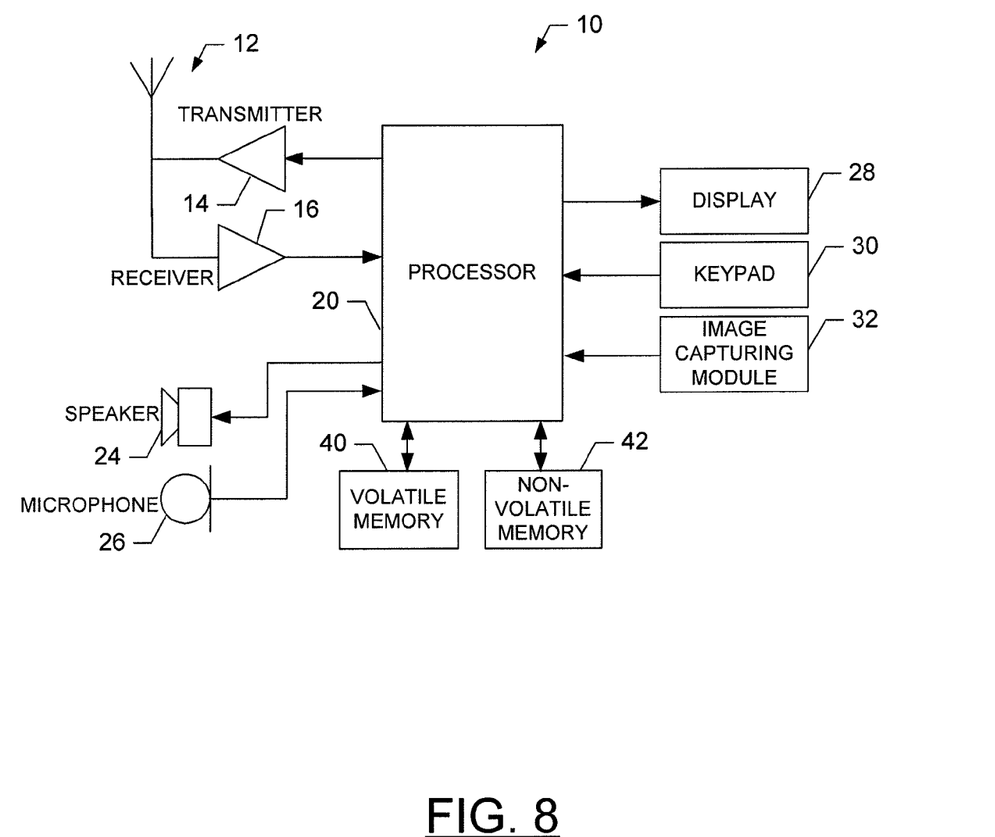
FIG. 8 illustrates a block diagram of a mobile terminal configured for visual search stability according to an example embodiment of the present invention.

The description provided above and generally herein illustrates example methods, example apparatuses, and example computer program products for determining results of a visual search, using, for example, techniques that can improve the stability of the results. FIG. 7 and FIG. 8 depict example apparatuses that are configured to perform various functionalities as described herein, including those described with respect to operations of the flowcharts of FIGS. 2, 6, and 9.

Referring now to FIG. 7, an example embodiment of the present invention is depicted as apparatus 500. Apparatus 500 may, be embodied as, or included as a component of, a communications device with wired or wireless communications capabilities. In some example embodiments, the apparatus 500 may be part of a communications device, such as a stationary or a mobile communications terminal. As a stationary communications terminal, the apparatus 500 may be part of, or embodied as, a server, a computer, an access point (e.g., base station), communications switching device, or the like. As a mobile device, the apparatus 500 may be a mobile and/or wireless communications node such as, for example, a mobile and/or wireless server, computer, access point, communications switching device, handheld device (e.g., telephone, portable digital assistant (PDA), mobile television, gaming device, camera, video recorder, audio/video player, radio, and/or a global positioning system (GPS) device), any combination of the aforementioned, or the like. Regardless of the type of communications device, apparatus 500 may also include computing capabilities.

The example apparatus 500 includes or is otherwise in communication with a processor 505, a memory device 510, an Input/Output (I/O) interface 506, a communications interface 515, an image capturing module 530, a distance generator 540, a distance analyzer 545, and a result latch 550. The processor 505 may be embodied as various means for implementing the various functionalities of example embodiments of the present invention including, for example, a microprocessor, a coprocessor, a controller, a special-purpose integrated circuit such as, for example, an ASIC (application specific integrated circuit), an FPGA (field programmable gate array), or a hardware accelerator, processing circuitry or the like. According to one example embodiment, processor 505 may be representative of a plurality of processors, or one or more multiple core processors, operating in concert. Further, the processor 505 may be comprised of a plurality of transistors, logic gates, a clock (e.g., oscillator), other circuitry, and the like to facilitate performance of the functionality described herein. The processor 505 may, but need not, include one or more accompanying digital signal processors. In some example embodiments, the processor 505 is configured to execute instructions stored in the memory device 510 or instructions otherwise accessible to the processor 505. The processor 505 may be configured to operate such that the processor causes the apparatus 500 to perform various functionalities described herein.

Whether configured as hardware or via instructions stored on a computer-readable storage medium, or by a combination thereof, the processor 505 may be an entity capable of performing operations according to embodiments of the present invention while configured accordingly. Thus, in example embodiments where the processor 505 is embodied as, or is part of, an ASIC, FPGA, or the like, the processor 505 is specifically configured hardware for conducting the operations described herein. Alternatively, in example embodiments where the processor 505 is embodied as an executor of instructions stored on a computer-readable storage medium, the instructions specifically configure the processor 505 to perform the algorithms and operations described herein. In some example embodiments, the processor 505 is a processor of a specific device (e.g., a communications server or mobile terminal) configured for employing example embodiments of the present invention by further configuration of the processor 505 via executed instructions for performing the algorithms, methods, and operations described herein.

The memory device 510 may be one or more computer-readable storage media that may include volatile and/or non-volatile memory. In some example embodiments, the memory device 510 includes Random Access Memory (RAM) including dynamic and/or static RAM, on-chip or off-chip cache memory, and/or the like. Further, memory device 510 may include non-volatile memory, which may be embedded and/or removable, and may include, for example, read-only memory, flash memory, magnetic storage devices (e.g., hard disks, floppy disk drives, magnetic tape, etc.), optical disc drives and/or media, non-volatile random access memory (NVRAM), and/or the like. Memory device 510 may include a cache area for temporary storage of data. In this regard, some or all of memory device 510 may be included within the processor 505. In some example embodiments, the memory device 510 may store a image matching database that can be used for image comparisons to determine image matching distances, matching results, and the like.

Further, the memory device 510 may be configured to store information, data, applications, computer-readable program code instructions, and/or the like for enabling the processor 505 and the example apparatus 500 to carry out various functions in accordance with example embodiments of the present invention described herein. For example, the memory device 510 could be configured to buffer input data for processing by the processor 505. Additionally, or alternatively, the memory device 510 may be configured to store instructions for execution by the processor 505.

The I/O interface 506 may be any device, circuitry, or means embodied in hardware, software, or a combination of hardware and software that is configured to interface the processor 505 with other circuitry or devices, such as the communications interface 515. In some example embodiments, the processor 505 may interface with the memory 510 via the I/O interface 506. The I/O interface 506 may be configured to convert signals and data into a form that may be interpreted by the processor 505. The I/O interface 506 may also perform buffering of inputs and outputs to support the operation of the processor 505. According to some example embodiments, the processor 505 and the I/O interface 506 may be combined onto a single chip or integrated circuit configured to perform, or cause the apparatus 500 to perform, various functionalities of the present invention.

The communication interface 515 may be any device or means embodied in either hardware, a computer program product, or a combination of hardware and a computer program product that is configured to receive and/or transmit data from/to a network 520 and/or any other device or module in communication with the example apparatus 500. The communications interface may be configured to communicate information via any type of wired or wireless connection, and via any type of communications protocol, such as communications protocol that support cellular communications. According to various example embodiments, the communication interface 515 is configured to support the transmission and reception of communications in cellular networks, such as, for example, in a Long Term Evolution (LTE) environment using, for example, an evolved UMTS (Universal Mobile Telecommunications System) Terrestrial Radio Access Network (e-UTRAN) air interface. In this regard, the communications interface 515 may be configured to support device-to-device communications in, for example, LTE-based networks. Processor 505 may also be configured to facilitate communications via the communications interface by, for example, controlling hardware included within the communications interface 515. In this regard, the communication interface 515 may include, for example, communications driver circuitry (e.g., circuitry that supports wired communications via, for example, fiber optic connections), one or more antennas, a transmitter, a receiver, a transceiver and/or supporting hardware, including, for example, a processor for enabling communications. Via the communication interface 515, the example apparatus 500 may communicate with various other network entities in a device-to-device fashion and/or via indirect communications via a base station, access point, server, gateway, router, or the like.

In some embodiments, the apparatus 500 may include an image capturing module 530, such as, for example, a camera, video/audio capturing module, in communication with or incorporated into the user interface 525. The image capturing mobile 530 may also be directly or indirectly in communication with the processor 505. The image capturing module 530 may be any means for capturing images, video/audio for storage, display, analysis, or transmission. For example, in an example embodiment in which the image capturing module 530 is a camera, the camera may be configured to form and save a digital image file from an image captured by the camera. In a video mode, the image capturing module 530 may be configured to periodically capture a video frame and cause delivery of the data describing the video frame to a location, e.g., memory device 510, that is accessible to processor 505 for analysis. The image capturing module 530 may be configured to capture media items in accordance with a number of capture settings. The capture settings may include, for example, focal length, zoom level, lens type, aperture, shutter timing, white balance, color, style (e.g., black and white, sepia, or the like), picture quality (e.g., pixel count), flash, red-eye correction, date, time, or the like. In some embodiments, the values of the capture settings (e.g., degree of zoom) may be obtained at the time an image is captured and stored in association with the captured image in a memory device, such as, memory device 510.

The image capturing module 530 can include all hardware, such as a lens or other optical component(s), and software necessary for creating a digital image file from a captured image. The media item capturing module 5330 may also include all hardware, such as a lens or other optical component(s), and software necessary to provide various media item capturing functionality, such as, for example, image zooming functionality. Image zooming functionality can include the ability to magnify or de-magnify an image prior to or subsequent to capturing an image.

In some example embodiments, the image capturing module 3530 may include only the hardware needed to view an image, while a memory device, such as the memory device 510 of the apparatus 500 stores instructions for execution by the processor 505 in the form of software necessary to create a digital image file from a captured image. In one example embodiment, the image capturing module 530 may further include a processor or co-processor which assists the processor 505 in processing image data and an encoder and/or decoder for compressing and/or decompressing image data. The encoder and/or decoder may encode and/or decode according to, for example, a joint photographic experts group (JPEG) standard or other format.

The distance generator 540, the distance analyzer 545, and the result latch 550 of example apparatus 500 may be any means or device embodied, partially or wholly, in hardware, a computer program product, or a combination of hardware and a computer program product, such as processor 505 implementing stored instructions to configure the example apparatus 500, memory device 510 storing executable program code instructions configured to carry out the functions described herein, or a hardware configured processor 505 that is configured to carry out the functions of the distance generator 540, the distance analyzer 545, and the result latch 550 as described herein. In an example embodiment, the processor 505 includes, or controls, the distance generator 540, the distance analyzer 545, and the result latch 550. The distance generator 540, the distance analyzer 545, and the result latch 550 may be, partially or wholly, embodied as processors similar to, but separate from processor 505. In this regard, the distance generator 540, the distance analyzer 545, and the result latch 550 may be in communication with the processor 505. In various example embodiments, the distance generator 540, the distance analyzer 545, and the result latch 550 may, partially or wholly, reside on differing apparatuses such that some or all of the functionality of the distance generator 540, the distance analyzer 545, and the result latch 550 may be performed by a first apparatus, and the remainder of the functionality of the distance generator 540, the distance analyzer 545, and the result latch 550 may be performed by one or more other apparatuses.

Further, the apparatus 500 and the processor 505 may be configured to perform the following functionality via distance generator 540. In this regard, the distance generator 540 may be configured to cause the processor 505 and/or the apparatus 500 to perform various functionalities, such as those described with respect to FIGS. 1a-6, and 9, and as generally described herein.

Figure 9:
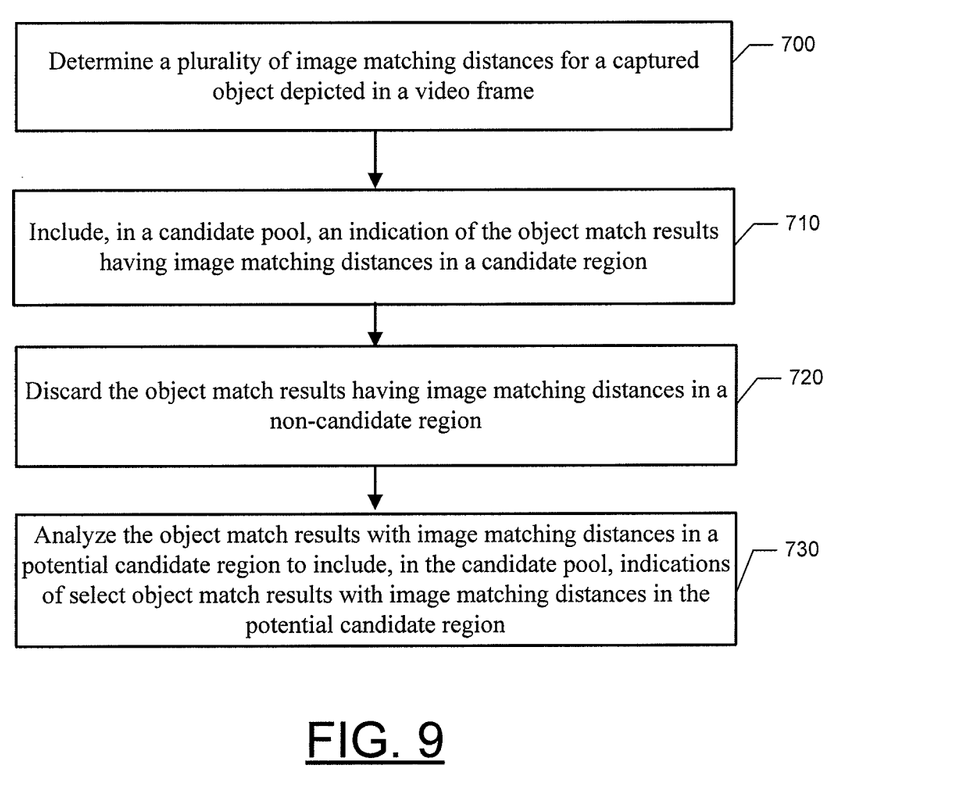
FIG. 9 is a flowchart of an example method for visual search stability according to an example embodiment of the present invention.

For example, with reference to FIG. 9, distance generator 540 may be configured to determine a plurality of image matching distances for a captured object depicted in a video frame at 700. In this regard, each image matching distance being indicative of a quality of a match between the captured object and a respective object match result. For example, according to some example embodiments, a high quality match may have a relatively low image matching distance, while a low quality match may have a relatively high image matching distance.

Further, the apparatus 500 and the processor 505 may be configured to perform the following functionality via distance analyzer 545. In this regard, the distance analyzer 545 may be configured to cause the processor 505 and/or the apparatus 500 to perform various functionalities, such as those described with respect to FIGS. 1a-6, and 9, and as generally described herein.

In this regard, the distance analyzer 545 may be configured to include, in a candidate pool, an indication of the object match results having image matching distances in a candidate region at 710, and discard the object match results having image matching distances in a non-candidate region at 720. Further, the distance analyzer 545 may be configured to analyze the object match results with image matching distances in a potential candidate region to include, in the candidate pool, indications of select object match results with image matching distances in the potential candidate region at 730. In some example embodiments, the distance analyzer may be configured to analyze the object match results with indications in the candidate pool with respect to a result history to identify a selected object match result.

In some example embodiments, the distance analyzer 545 may be configured to analyze the object match results with image matching distances in the potential candidate region by clustering the image matching distances in the potential candidate region into a first cluster and a second cluster based in part on a holistic cluster distance for the first cluster and a holistic cluster distance for the second cluster, discarding object match results with image matching distances in the second cluster, and including indications of object match results with image matching distances in the first cluster in the candidate pool. Additionally, or alternatively, in some example embodiments, the distance analyzer 545 may be configured to apply a first adaptive threshold or a second adaptive threshold to the image matching distances associated with the object match results having indications in the candidate pool based in part upon whether a result history for the captured object has been defined, and determine object match results to include in the result history based on the applied first or second threshold. Additionally, or alternatively, in some example embodiments, the distance analyzer 545 may be configured to analyze the image matching distances of the object match results indicated in the candidate pool with respect to a result history to identify at least two selected object match results, determine respective confidence levels for the at least two selected object match results based in part on a respective result history frequencies for the of the at least two selected object match results, and cause representations of the at least two selected object match results to be output to a user interface. In some example embodiments, the distance analyzer 545 may alternatively or additionally cause representations of a hierarchy of information links to be output to the user interface for the at least two selected object match results.

Further, the apparatus 500 and the processor 505 may be configured to perform the following functionality via result latch 550. In this regard, the result latch 550 may be configured to cause the processor 505 and/or the apparatus 500 to perform various functionalities, such as those described with respect to FIGs. 1a-6, and 9, and as generally described herein.

The result latch 550 may be configured to cause a representation of the selected object match result to be output to a user interface as a previous object match result, determine a current selected object match result, determine a confidence level for the current selected object match result, and cause a representation of the current selected object match result to be output to a user interface based in part on the confidence level of the current selected object match result. In some example embodiments, the result latch may be configured to, additionally or alternatively, cause a representation of the selected object match result to be output to a user interface as a previous object match result, determine a current selected object match result, determine a confidence level for the previous object match result and the current selected object match result, and cause a representation of the previous object match result to be output to a user interface based in part on the confidence level of the current selected object match result, the confidence level of the previous object match result, and a status of a timer.

Referring now to FIG. 8, a more specific example apparatus in accordance with various embodiments of the present invention is provided. The example apparatus of FIG. 8 is a mobile terminal 10 configured to communicate within a wireless network, such as a cellular communications network. The mobile terminal 10 may be configured to perform the functionality of the mobile terminals 110 or apparatus 500 as described herein. More specifically, the mobile terminal 10 may be caused to perform the functionality described with respect to FIGS. 1a-6 and FIG. 9 via the processor 20. Processor 20 may be an integrated circuit or chip configured similar to the processor 505 together with, for example, the I/O interface 506. Further, volatile memory 40 and non-volatile memory 42 may configured to support the operation of the processor 20 as computer readable storage media.

The mobile terminal 10 may also include an antenna 12, a transmitter 14, and a receiver 16, which may be included as parts of a communications interface of the mobile terminal 10. The speaker 24, the microphone 26, the display 28 (which may be a touch screen display), and the keypad 30 may be included as parts of a user interface. Mobile terminal 10 may also include an image capturing module 32, which may be configured in the manner described with respect to image capturing module 530.

FIGS. 2, 6, and 9 illustrate flowcharts of example systems, methods, and/or computer program products according to example embodiments of the invention. It will be understood that each operation of the flowcharts, and/or combinations of operations in the flowcharts, can be implemented by various means. Means for implementing the operations of the flowcharts, combinations of the operations in the flowchart, or other functionality of example embodiments of the present invention described herein may include hardware, and/or a computer program product including a computer-readable storage medium (as opposed to a computer-readable transmission medium which describes a propagating signal) having one or more computer program code instructions, program instructions, or executable computer-readable program code instructions stored therein. In this regard, program code instructions for performing the operations and functions of FIGS. 2, 6, and 9 may be stored on a memory device, such as memory device 510, volatile memory 40, or volatile memory 42, of an example apparatus, such as example apparatus 500 or mobile terminal 10, and executed by a processor, such as the processor 505 or processor 20. As will be appreciated, any such program code instructions may be loaded onto a computer or other programmable apparatus (e.g., processor 505, memory device 510, or the like) from a computer-readable storage medium to produce a particular machine, such that the particular machine becomes a means for implementing the functions specified in the flowcharts' operations. These program code instructions may also be stored in a computer-readable storage medium that can direct a computer, a processor, or other programmable apparatus to function in a particular manner to thereby generate a particular machine or particular article of manufacture. The instructions stored in the computer-readable storage medium may produce an article of manufacture, where the article of manufacture becomes a means for implementing the functions specified in the flowcharts' operations. The program code instructions may be retrieved from a computer-readable storage medium and loaded into a computer, processor, or other programmable apparatus to configure the computer, processor, or other programmable apparatus to execute operations to be performed on or by the computer, processor, or other programmable apparatus. Retrieval, loading, and execution of the program code instructions may be performed sequentially such that one instruction is retrieved, loaded, and executed at a time. In some example embodiments, retrieval, loading and/or execution may be performed in parallel such that multiple instructions are retrieved, loaded, and/or executed together. Execution of the program code instructions may produce a computer-implemented process such that the instructions executed by the computer, processor, or other programmable apparatus provide operations for implementing the functions specified in the flowcharts' operations.

Accordingly, execution of instructions associated with the operations of the flowchart by a processor, or storage of instructions associated with the blocks or operations of the flowcharts in a computer-readable storage medium, support combinations of operations for performing the specified functions. It will also be understood that one or more operations of the flowcharts, and combinations of blocks or operations in the flowcharts, may be implemented by special purpose hardware-based computer systems and/or processors which perform the specified functions, or combinations of special purpose hardware and program code instructions.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions other than those explicitly described above are also contemplated as may be set forth in some of the appended claims. Although specific terms are employed herein, they are used in a generic and descriptive sense only and not for purposes of limitation.

What is claimed is:

1. A method comprising:
    determining a plurality of image matching distances for a captured object depicted in a video frame, each image matching distance being indicative of a quality of a match between the captured object and a respective object match result;
    including, in a candidate pool, an indication of the object match results having image matching distances in a candidate region;
    discarding the object match results having image matching distances in a non-candidate region; and
    analyzing the object match results with image matching distances in a potential candidate region to include, in the candidate pool, indications of select object match results with image matching distances in the potential candidate region.

2. The method of claim 1, further comprising analyzing the object match results with indications in the candidate pool with respect to a result history to identify a selected object match result.

3. The method of claim 2, further comprising:
    causing a representation of the selected object match result to be output to a user interface as a previous object match result;
    determining a current selected object match result;
    determining a confidence level for the current selected object match result; and
    causing a representation of the current selected object match result to be output to a user interface based in part on the confidence level of the current selected object match result.

4. The method of claim 2, further comprising:
    causing a representation of the selected object match result to be output to a user interface as a previous object match result;
    determining a current selected object match result;
    determining a confidence level for the previous object match result and the current selected object match result; and
    causing a representation of the previous object match result to be output to a user interface based in part on the confidence level of the current selected object match result, the confidence level of the previous object match result, and a status of a timer.

5. The method of claim 1, wherein analyzing the object match results with image matching distances in the potential candidate region to include, in the candidate pool, indications of select object match results with image matching distances in the potential candidate region includes:
    clustering the image matching distances in the potential candidate region into a first cluster and a second cluster based in part on a holistic cluster distance for the first cluster and a holistic cluster distance for the second cluster;
    discarding object match results with image matching distances in the second cluster; and
    including indications of object match results with image matching distances in the first cluster in the candidate pool.

6. The method of claim 1, further comprising:
applying a first adaptive threshold or a second adaptive threshold to the image matching distances associated with the object match results having indications in the candidate pool based in part upon whether a result history for the captured object has been defined; and
determining object match results to include in the result history based on the applied first or second threshold.

7. The method of claim 1, further comprising further comprising:
analyzing the image matching distances of the object match results indicated in the candidate pool with respect to a result history to identify at least two selected object match results;
determining respective confidence levels for the at least two selected object match results based in part on a respective result history frequencies for the of the at least two selected object match results; and
causing representations of the at least two selected object match results to be output to a user interface.

8. The method of claim 7, further comprising causing representations of a hierarchy of information links to be output to the user interface for the at least two selected object match results.

9. An apparatus comprising at least one processor and at least one memory including computer program code, the at least one memory and the computer program code configured to, with the at least one processor, cause the apparatus at least to:
determine a plurality of image matching distances for a captured object depicted in a video frame, each image matching distance being indicative of a quality of a match between the captured object and a respective object match result;
include, in a candidate pool, an indication of the object match results having image matching distances in a candidate region;
discard object match results having image matching distances in a non-candidate region; and
analyze the object match results with image matching distances in a potential candidate region to include, in the candidate pool, indications of select object match results with image matching distances in the potential candidate region.

10. The apparatus of claim 9, wherein the apparatus is further caused to analyze the object match results with indications in the candidate pool with respect to a result history to identify a selected object match result.

11. The apparatus of claim 10, wherein the apparatus is further caused to:
cause a representation of the selected object match result to be output to a user interface as a previous object match result;
determine a current selected object match result;
determine a confidence level for the current selected object match result; and
cause a representation of the current selected object match result to be output to a user interface based in part on the confidence level of the current selected object match result.

12. The apparatus of claim 10, wherein the apparatus is further caused to:
cause a representation of the selected object match result to be output to a user interface as a previous object match result;
determine a current selected object match result;
determine a confidence level for the previous object match result and the current selected object match result; and
cause a representation of the previous object match result to be output to a user interface based in part on the confidence level of the current selected object match result, the confidence level of the previous object match result, and a status of a timer.

13. The apparatus of claim 9, wherein the apparatus caused to analyze the object match results with image matching distances in the potential candidate region to include, in the candidate pool, indications of select object match results with image matching distances in the potential candidate region includes being caused to:
cluster the image matching distances in the potential candidate region into a first cluster and a second cluster based in part on a holistic cluster distance for the first cluster and a holistic cluster distance for the second cluster;
discard object match results with image matching distances in the second cluster; and
include indications of object match results with image matching distances in the first cluster in the candidate pool.

14. The apparatus of claim 9, wherein the apparatus is further caused to:
apply a first adaptive threshold or a second adaptive threshold to the image matching distances associated with the object match results having indications in the candidate pool based in part upon whether a result history for the captured object has been defined; and
determine object match results to include in the result history based on the applied first or second threshold.

15. The apparatus of claim 9, wherein the apparatus is further caused to:
analyze the image matching distances of the object match results indicated in the candidate pool with respect to a result history to identify at least two selected object match results;
determine respective confidence levels for the at least two selected object match results based in part on a respective result history frequencies for the of the at least two selected object match results; and
cause representations of the at least two selected object match results to be output to a user interface.

16. The apparatus of claim 15, wherein the apparatus is further caused to cause representations of a hierarchy of information links to be output to the user interface for the at least two selected object match results.

17. The apparatus of claim 9, wherein the apparatus comprises a mobile terminal; and wherein the apparatus further comprises user interface circuitry configured to facilitate user control of at least some functions of the mobile terminal through the use of a display and configured to respond to user inputs, and a display and display circuitry configured to display at least a portion of a user interface of the mobile terminal.

18. A computer program product comprising a non-transitory computer readable storage medium having program code stored thereon, the program code, when executed, causes an apparatus to:
determine a plurality of image matching distances for a captured object depicted in a video frame, each image matching distance being indicative of a quality of a match between the captured object and a respective object match result;
include, in a candidate pool, an indication of the object match results having image matching distances in a candidate region;
discard object match results having image matching distances in a non-candidate region; and analyze the object match results with image matching distances in a potential candidate region to include, in the candidate pool, indications of select object match results with image matching distances in the potential candidate region.

19. The computer program product of claim 18, wherein the program code further causes the apparatus to analyze the object match results with indications in the candidate pool with respect to a result history to identify a selected object match result.

20. The computer program product of claim 19, wherein the program code further causes the apparatus to:
- cause a representation of the selected object match result to be output to a user interface as a previous object match result;
- determine a current selected object match result;
- determine a confidence level for the previous object match result and the current selected object match result; and
- cause a representation of the previous object match result to be output to a user interface based in part on the confidence level of the current selected object match result, the confidence level of the previous object match result, and a status of a timer.

* * * * *